(12) United States Patent
Müller et al.

(10) Patent No.: US 7,377,097 B2
(45) Date of Patent: May 27, 2008

(54) CHAIN LINK FOR CONVEYING CHAIN OF A MACHINE OF THE TOBACCO-PROCESSING INDUSTRY

(75) Inventors: Thomas Müller, Hamburg (DE); Jan Stellmacher, Hamburg (DE)

(73) Assignee: Hauni Maschinenbau AG, Hamburg (DE)

( * ) Notice: Subject to any disclaimer, the term of this patent is extended or adjusted under 35 U.S.C. 154(b) by 293 days.

(21) Appl. No.: 10/994,419

(22) Filed: Nov. 23, 2004

(65) Prior Publication Data

US 2005/0109009 A1    May 26, 2005

(30) Foreign Application Priority Data

Nov. 25, 2003   (DE) ................ 103 55 872

(51) Int. Cl.
*F16G 13/00*    (2006.01)
*B65G 17/06*    (2006.01)

(52) U.S. Cl. .......................... 59/78; 198/852
(58) Field of Classification Search ........ 198/840–841, 198/850–853; 59/5, 78, 84, 88
See application file for complete search history.

(56) References Cited

U.S. PATENT DOCUMENTS

| 145,771 | A | * | 12/1873 | Wheeler | ............ | 198/850 |
| 1,330,116 | A | | 2/1920 | Hunt | | |
| 3,768,631 | A | * | 10/1973 | Wahren | ............ | 198/852 |
| 4,473,365 | A | * | 9/1984 | Lapeyre | ............ | 198/850 |
| 4,597,492 | A | * | 7/1986 | Lachonius et al. | ......... | 198/852 |

(Continued)

FOREIGN PATENT DOCUMENTS

DE    26 46 703 A1    4/1977

(Continued)

OTHER PUBLICATIONS

European Search Report dated Aug. 13, 2007.

*Primary Examiner*—Derris H. Banks
*Assistant Examiner*—Teresa M Bonk
(74) *Attorney, Agent, or Firm*—Venable LLP; Robert Kinberg; Kyle D. Petaja (57) ABSTRACT

A chain link for a conveying chain of a machine of the tobacco-processing industry, in particular a storage device for a rod-shaped tobacco product, includes holding means for a hinge pin and a hinge pin bearing for connecting the chain link to adjacent chain links, and a carrying surface for carrying a tobacco product, which carrying surface is arranged substantially parallel to the hinge plane defined by the hinge axes. The chain link is designed laterally for cooperation with a deflection plate of the machine which rotates about a substantially vertical axis. During cooperation with the deflection plate the chain link is designed to pivot about a longitudinal pivot axis parallel to the longitudinal axis. The chain link has a guide element which cooperates with the deflection plate and which is designed in such a way that a pivot movement of the chain link about the longitudinal pivot axis is counteracted by a frictional force exerted by the deflection plate on the guide element. On the side of the carrying surface the chain link is designed to cooperate with a round deflection roller of the machine, which rotates about a substantially horizontal axis, wherein contact of the chain link with the deflection roller lies in the region of one of the hinge axes.

24 Claims, 7 Drawing Sheets

U.S. PATENT DOCUMENTS

| | | | |
|---|---|---|---|
| 4,893,709 A | 1/1990 | Schroeder et al. | |
| 5,738,205 A * | 4/1998 | Dræbel | 198/852 |
| 6,209,716 B1 * | 4/2001 | Bogle et al. | 198/852 |

FOREIGN PATENT DOCUMENTS

| | | |
|---|---|---|
| DE | 81 12 284 | 9/1981 |
| DE | 43 12 864 C2 | 10/1993 |
| DE | 44 03 594 A1 | 8/1995 |
| DE | 693 12 384 T2 | 5/1998 |
| DE | 298 06 540 U1 | 11/1998 |
| DE | 198 17 125 A1 | 10/1999 |
| EP | 0 680 898 B1 | 11/1995 |
| EP | 0 790 196 A1 | 8/1997 |
| EP | 1 094 018 A1 | 4/2001 |
| GB | 2 225 762 A | 6/1990 |

* cited by examiner

CHAIN LINK FOR CONVEYING CHAIN OF A MACHINE OF THE TOBACCO-PROCESSING INDUSTRY

CROSS-REFERENCE TO RELATED APPLICATION

This application claims the priority of German Patent Application No. 103 55 872.1, filed on Nov. 25, 2003, the subject matter of which is incorporated herein by reference.

BACKGROUND OF THE INVENTION

The invention concerns a chain link for a conveying chain of a machine of the tobacco-processing industry, in particular a storage device for a rod-shaped tobacco product, with holding means for a hinge pin and with a hinge pin bearing for connecting the chain link to adjacent chain links, and with a carrying surface for carrying a tobacco product, which carrying surface is arranged substantially parallel to the hinge plane defined by the hinge axes, wherein the chain link is designed laterally for cooperation with a deflection plate of the machine which rotates about a substantially vertical axis, wherein during co-operation with the deflection plate the chain link is designed to pivot about a longitudinal pivot axis parallel to the longitudinal axis of the chain link.

Chain links for a conveying chain are known from EP 0 680 898 B1 or DE 43 12 864 C2. When using such chain links for conveying chains, for example, in cigarette storage devices with deflection plates whose axis of rotation is inclined to the vertical, there is provision for pivoting the chain link about a longitudinal pivot axis in the region of contact between chain link and deflection wheel, in order to keep the carrying surface of the chain links horizontal during deflection. With this arrangement, the tensile stress of the conveying chain in the region of the deflection plate causes a pivot moment on the chain links which is in practice received by a position-fixing guide on the outside of the deflected chain links. The longer the portion of the conveying chain which cooperates with deflection plates, the more the friction losses associated with the above have an adverse effect.

In the state of the art, the hinge plane is arranged above the middle between the carrying surface and a lower side of the chain link opposite the carrying surface (see EP 0 680 898 B1), in order to produce compensation for the pivot moment caused by the product conveyed. On the other hand, however, as a result of the chain tension, this arrangement leads to a pivot moment on the chain link about a pivot axis parallel to the longitudinal axis and hence aggravation of the above-mentioned problems.

When using chain links for conveying chains in machines with deflection rollers whose axis of rotation is arranged substantially horizontally, a disadvantageous bending moment on the chain links cooperating with the deflection roller arises due to the tensile stress of the conveying chain when these chain links cooperate with the deflection roller on the side of their carrying surface roughly in the middle between the hinge pin and the hinge pin bearing. This could be avoided by using deflection rollers of polygonal cross-section, each polygonal section being provided for cooperation with one chain link. For example, owing to wear of the conveying chain, this can lead to problems in synchronization between conveying chain and deflection plate. Further, keeping the conveying chain in a horizontal plane poses problems with a polygonal deflection roller.

SUMMARY OF THE INVENTION

It is the object of the invention to provide a chain link for a conveying chain in a machine of the tobacco processing industry in which the drawbacks on account of the bending or pivot moments caused by the chain tension are reduced, and which in particular allows deflection of the conveying chain with low loss and wear and with stability of position.

The invention achieves this object by the characteristics of independent claims 1 and 13. According to one aspect, the invention provides in particular that the chain link has a guide element which cooperates with the deflection plate and which is designed in such a way that a pivot movement of the chain link about the longitudinal pivot axis is counteracted by a frictional force exerted by the deflection plate on the guide element. Corresponding pivoting of the chain link, and hence friction losses owing to the friction of the chain link on a position-fixing guide, can be considerably reduced, and probably prevented thereby. The frictional force here means static or sliding friction and is therefore delimited from rolling friction. The guide element according to the invention is intended to prevent the chain link rolling at the deflection plate about a longitudinal pivot axis of the chain link.

The arrangement of the carrying surface substantially parallel to the hinge plane relates to the tobacco product-receiving portion of the carrying surface, i.e. apart from drivers for the tobacco product, for example. The substantially vertical axis of rotation of the deflection plate means that the largest directional component of the axis of rotation is the vertical component, and so also includes axes of rotation inclined to the vertical.

The result of the invention can be obtained by various shapes of guide element. Particularly simple and therefore preferred is a groove extending substantially parallel to the longitudinal axis in the side wall, for engaging the deflection plate. Appropriately here the inside width of the groove in cross-section is smaller than the axial extent, i.e. the material thickness of the deflection plate.

Preferably, the depth of the groove in cross-section is larger than the engagement of the deflection plate in the groove. This allows selective wear of material by removal of the outer edges of the groove, wherein the deflection plate enters the groove deeper so that the friction effect is preserved. The material region below the outer edges of the groove therefore forms a wear reserve.

Preferably, the groove has a shape tapering towards the interior of the groove, i.e. towards the bottom of the groove. With a cross-sectional shape of the deflection plate tapering towards the outer edge, this creates a larger friction surface and hence improved friction effect. Preferably, the groove therefore has side walls which are inclined towards the interior of the groove and which form with the plane of symmetry an angle preferably within the range of 10° to 60°, further preferably 20° to 50°, further preferably 35° to 45°.

Particularly promising is the application of the invention in machines with deflection plates whose axis of rotation is inclined to the vertical, as it is the tilt of the deflection plates that causes pivot moments at the chain links about a longitudinal pivot axis and the associated problems. Appropriately, therefore, the shape of the guide element allows pivoting about the longitudinal pivot axis in the region of contact between chain link and deflection wheel. The pivot range about the longitudinal pivot axis is appropriately intended to permit a horizontal orientation of the carrying surface of the chain link during deflection.

Preferably the guide element is arranged substantially in the hinge plane in order to reduce pivot moments about a longitudinal pivot axis acting on the chain link as a result of the chain tension.

According to a second aspect, the invention provides in particular that the chain link is designed on the side of the carrying surface to cooperate with a round deflection roller of the machine, which rotates about a substantially horizontal axis, wherein contact of the chain link with the deflection roller lies in the region of one of the hinge axes, i.e. in the region of the axis of the holding means for the hinge pin or preferably of the hinge pin bearing. By displacement of the points of contact of the chain link into the region of one of the hinge axes, a bending moment acting on the chain links is prevented or at least minimized.

According to a preferred embodiment, in the wall forming the carrying surface is provided a recess along the longitudinal axis for the deflection roller. The recess can also be used for lateral guiding of the deflection roller; this can be achieved in particular if the width of the recess substantially corresponds to the axial extent of the deflection roller. Furthermore, this embodiment allows the use of known chain links by making a recess. Such a recess is not compulsory, however. In another embodiment a projection can be arranged on the carrying surface in the vicinity of the hinge axes, which projection is in contact with the deflection roller. Such a projection can be formed, for example, by a driver for the tobacco product if this driver, instead of its conventional arrangement, is arranged approximately between the hinge axes in their vicinity. In this case, a recess can also be provided in the projection, which recess runs in the longitudinal axis and in which the deflection roller engages to cause lateral guiding. The depth of the recess is then appropriately smaller than the height of the projection above the carrying surface.

According to an advantageous feature, the hinge plane is arranged approximately in the middle between the carrying surface and a lower side of the chain link opposite the carrying surface. As a result, the pivot moment on the chain links about a longitudinal pivot axis can be reduced. This aspect of the invention may be independent, i.e. may be claimed in a form only referring back to the preamble of claim 1.

BRIEF DESCRIPTION OF THE DRAWINGS

Further advantageous characteristics and embodiments of the invention are apparent from the subsidiary claims and the following description of the invention with reference to the attached drawings. They show:

DETAILED DESCRIPTION OF THE INVENTION

Figure 1:
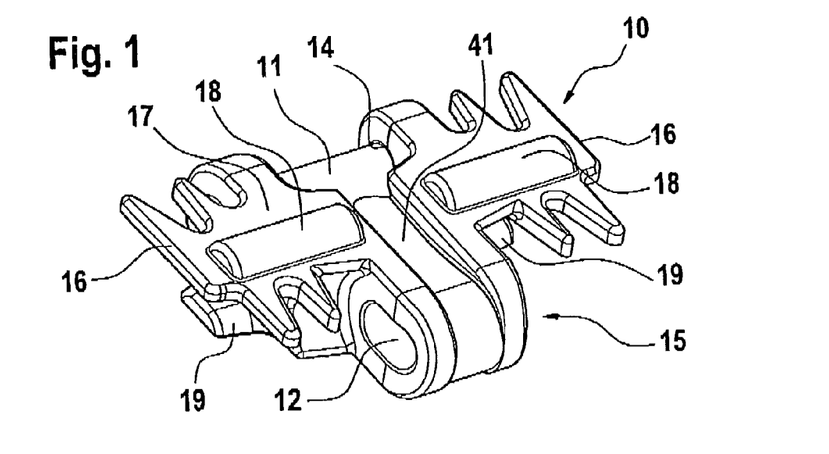
FIG. 1 a first perspective view of a chain link.
Figure 2:
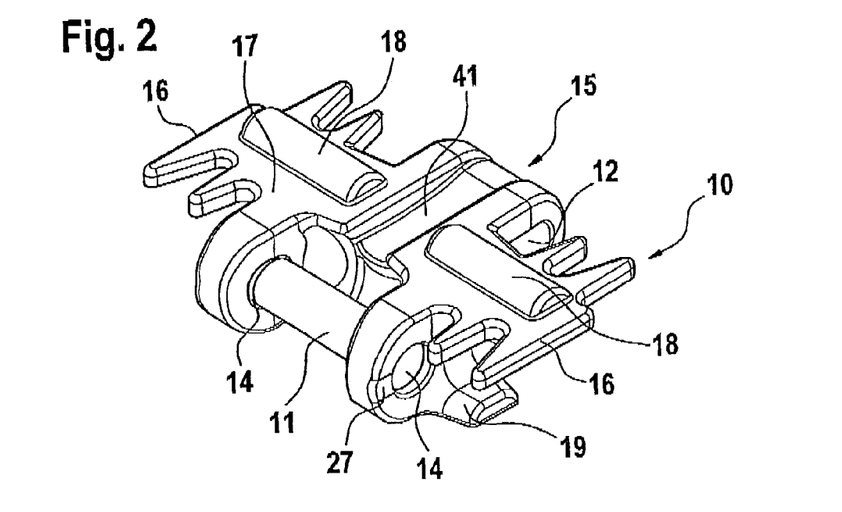
FIG. 2 a second perspective view of the chain link.
Figure 3:
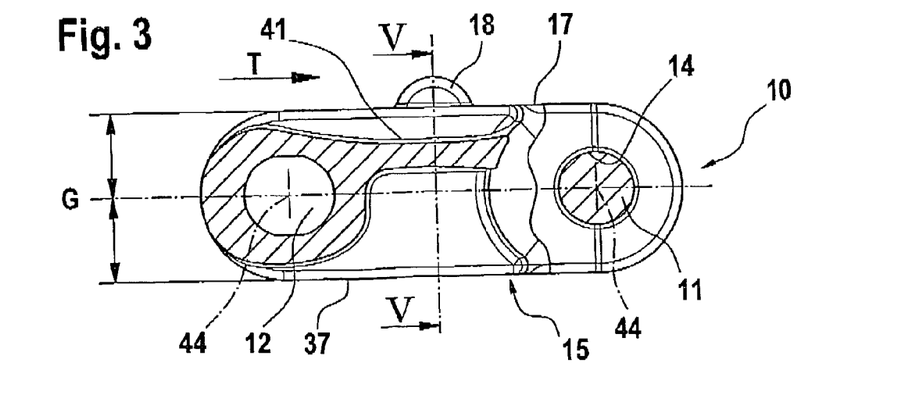
FIG. 3 a cross-sectional view of the chain link in a section through the plane of symmetry.
Figure 4:
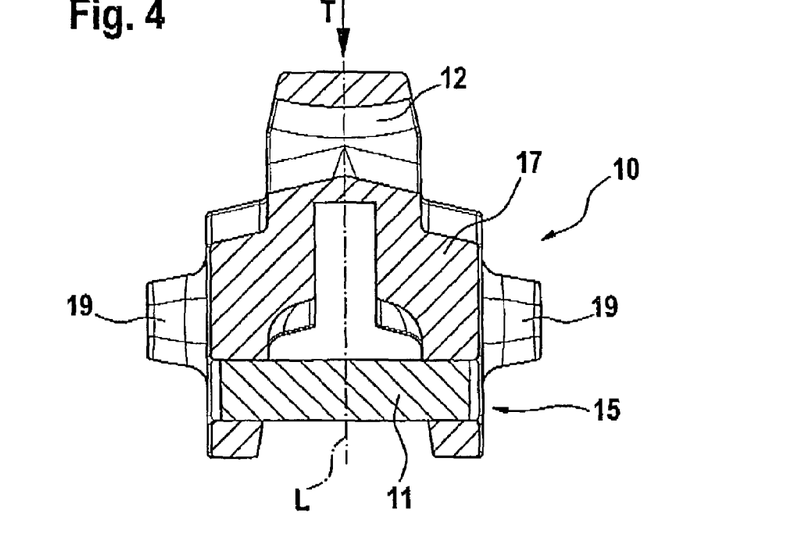
FIG. 4 a top view of the chain link in a cross-section through the hinge plane.

A chain link 10 includes receptacles 14 for holding a hinge pin 11 and a hinge pin bearing 12. By means of the hinge pin 11, chain links 10 can be joined into a conveying chain 13 for a machine of the tobacco processing industry. The hinge plane G is defined by the hinge axes, i.e. the centre axes of the hinge pin receptacle 14 and of the hinge pin bearing 12 (see FIG. 3). The direction of transport T runs preferably in the arrow direction as in FIGS. 3, 4 and 9; however, it can also run opposite this arrow direction.

Two plate-shaped carrying elements 16 are laterally attached to the main body 15 of the chain link 10. The term "laterally" refers to the longitudinal axis L of the chain link 10 (see FIG. 4), which arises as the sectional straight line of the hinge plane G and the plane of symmetry S. A carrying surface 17 of the chain link 10, which is oriented parallel to the hinge plane and consists of aligned surfaces of the carrying elements 16 and main body 15, is used to carry a rod-shaped tobacco product, in particular cigarettes, whose longitudinal axes are oriented parallel to the hinge axes. On the carrying surface 17 of the chain link 10 are provided elongate drivers 18 oriented parallel to the hinge axes for the tobacco product to be conveyed.

On the lower side 37 of the chain link 10 opposite the carrying elements 16 are laterally attached guide wings 19. In a cross-section perpendicular to the longitudinal axis L, as can be seen from FIG. 5, there is therefore on each side a U-shaped profile 26 consisting of the carrying element 16 with lower side 20, the guide wing 19 with upper side 21 and a wall portion 25 of the main body 15 forming a side wall 22. A deflection plate 23 can engage in the U-shaped guide profile 26 for substantially horizontally deflecting the chain link 10 or a conveying chain 13 composed of chain links 10, wherein the axis of rotation, not shown, of the deflection plate 23 is oriented substantially perpendicularly to the hinge plane G. Here, the outer edge 24 of the deflection plate 23 cooperates with the side wall 22 of the wall portion 25, i.e. the bottom of the U-shaped guide profile 26. The chain links 10 are accordingly designed to pivot about a pivot axis oriented substantially perpendicularly to the hinge plane. In particular, the hinge pin bearing 12 widens outwards, as can be seen from FIG. 4. The deflection plate 23 can be a wheel with spokes, for example.

Furthermore, the deflection plate 23 is rounded at its outer edge 24, as can be seen from FIG. 8, so that it can perform pivoting about the longitudinal pivot axis C of the chain link 10, as shown in FIG. 8 with a double arrow. For this purpose, the U-shaped guide profile 26 has sufficient width (i.e. sufficient distance from the lower side 20 of the carrying element 16 to the upper side 21 of the guide wing 19), which is in particular larger than the axial extent of the deflection plate 23 in the region of the guide profile 26.

Figure 6:
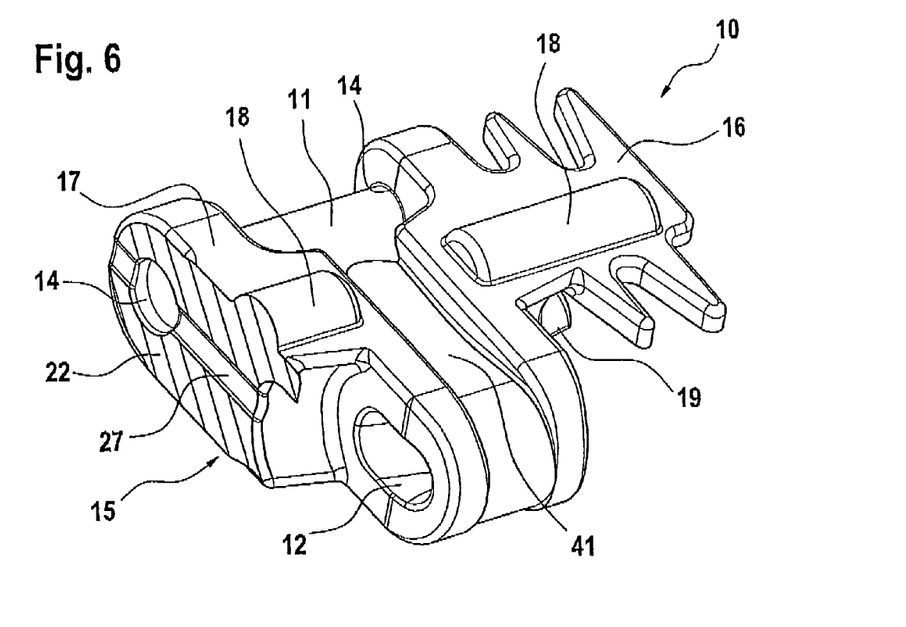
FIG. 6 the perspective view as in FIG. 1, but with a carrying-surface and guide wing cut off.
Figure 7:
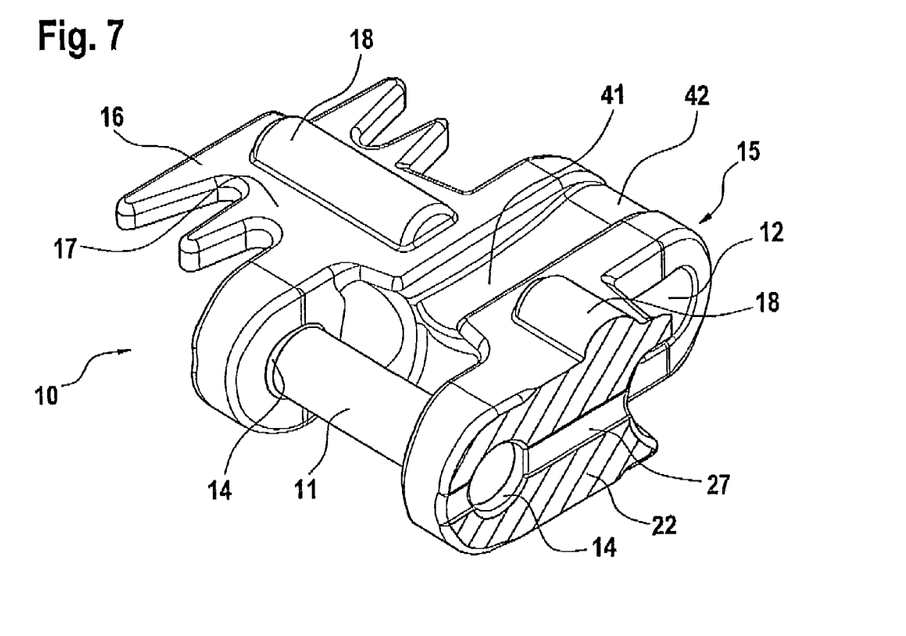
FIG. 7 the perspective view as in FIG. 2, but with a carrying-surface and guide wing cut off.

In the side wall 22 of the wall portion 25 is provided a groove 27 for engagement of the deflection plate 23. The groove 27 extends in the present example over the whole length of the side wall 22 of the main body 15 (see FIGS. 6, 7), which is easy to produce. However, it may also be provided only within a length range cooperating with the deflection plate 23.

Figure 8A:
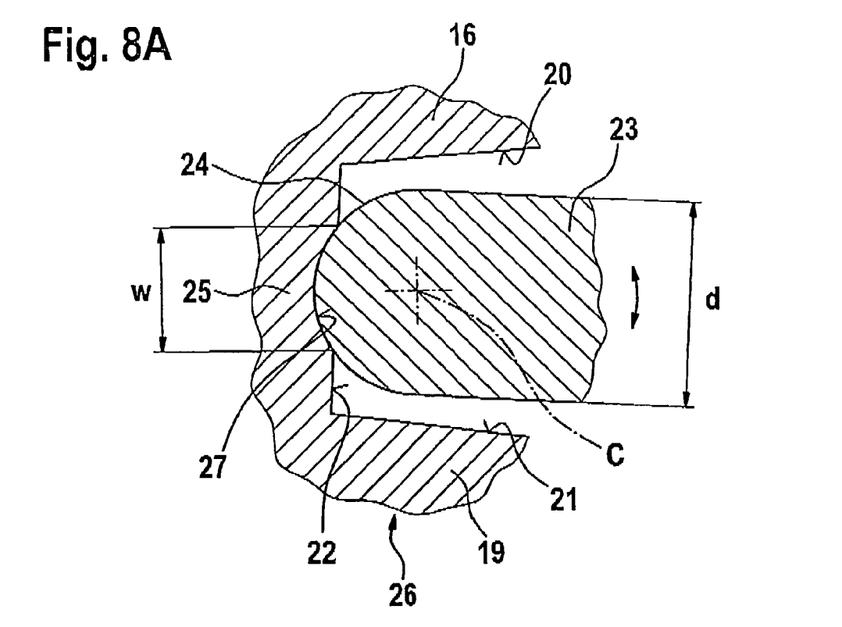
FIG. 8A a schematic detail from FIG. 5 in the region of the guide element according to a first embodiment.

In the example of FIG. 8A, the groove 27 is arcuate with a shape adapted to the radius of the outer curvature 24 of the deflection plate 23. The inside width w of the groove 27 here is smaller than the axial extent d of the deflection plate 23 in the region of the guide profile 26. The result is a frictional surface between the deflection plate 23 and the groove 27, wherein the friction caused thereby counteracts pivoting of the chain link 10 about the longitudinal pivot axis C and can probably even prevent it. In this respect, the groove 27, in which the friction effect described is exerted in the operating position of the chain link 10, i.e. when the carrying surface 17 is horizontal, differs from the U-shaped guide profile 26. In the case of a side wall 22 with no groove 27, a pivot movement of the deflection plate 23 about a longitudinal pivot axis of the chain link 10 would lead to the deflection plate 23 rolling over the side wall 22, so that in the operating position of the chain link 10, i.e. when the carrying surface 17 is horizontal, substantially no advantageous friction effect would be obtainable.

Figure 8B:
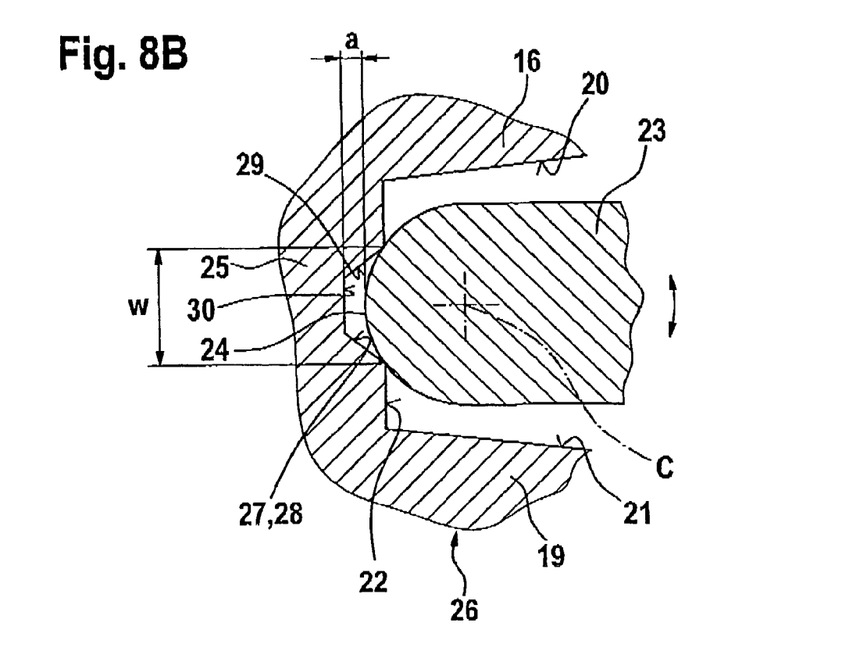
FIGS. 8B, C a schematic detail from FIG. 5 in the region of the guide element according to a second embodiment.
Figure 8C:
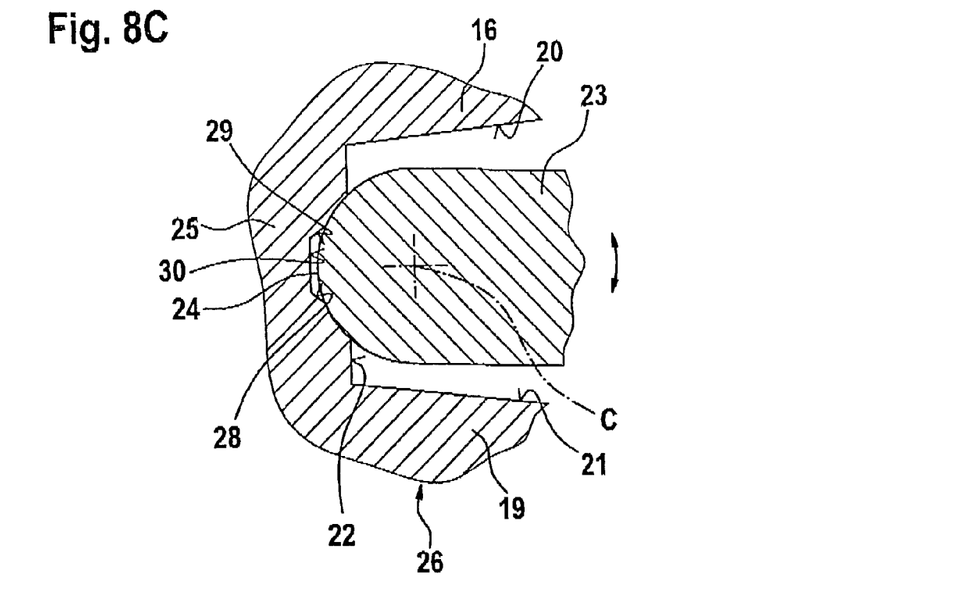

A preferred embodiment of the groove 27 is shown in FIG. 8B. The inwardly tapering groove 27 has two side walls 28, 29. Furthermore a flat groove bottom 30 is provided, but this is not necessarily the case. It is particularly advantageous that the depth of the groove 27 is larger in cross-section than the engagement of the deflection plate 23 in the groove, so that a free distance a from the tip of the deflection plate 23 to the groove bottom, i.e. the lowermost point of the groove 27, arises. The groove 27 therefore has in cross-section at least two different regions cooperating with the deflection plate 23. In case of these regions wearing down, i.e. the outer edges of the groove 27 or, more generally, wall material in the region of the guide element 27, this feature allows corresponding entry of the deflection plate 23 into the groove 27 (see FIG. 8C), the frictional surface between deflection plate 23 and groove 27 being preserved. Without the free distance a, there could be lateral widening of the groove 27 and hence a decrease in friction effect.

Figure 8D:
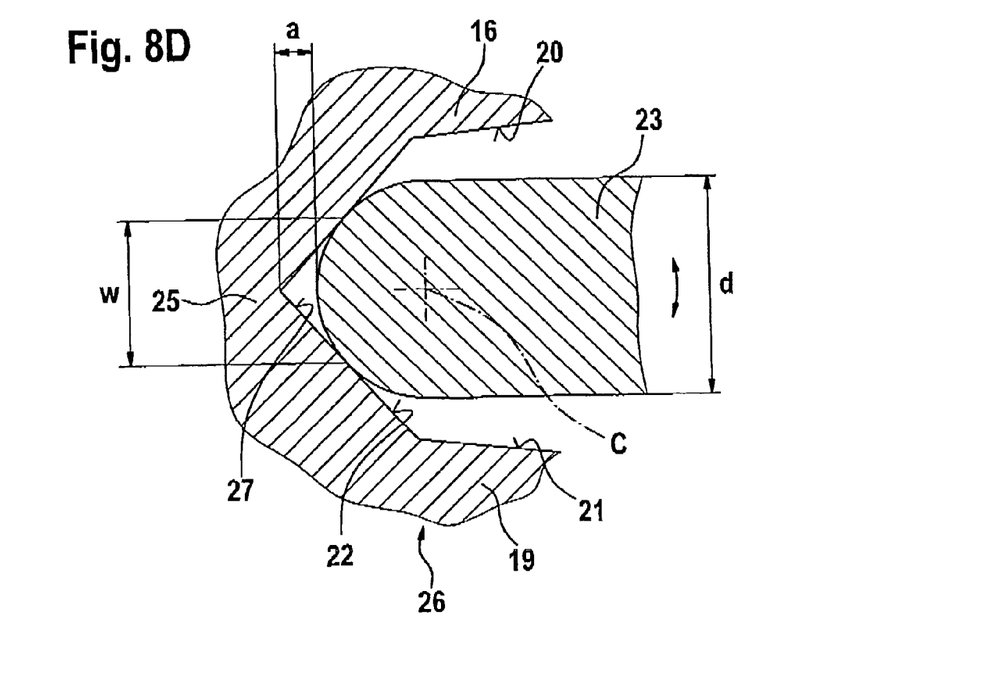
FIG. 8D a schematic detail from FIG. 5 in the region of the guide element according to a third embodiment.

The embodiment as in FIG. 8D shows that the side wall 22 of the main body 15 does not have to be a flat surface oriented substantially parallel to the plane of symmetry S. The actual groove 27 extends from the points of contact of the deflection plate 23 with the chain link 10 into the interior of the groove. Also, in the example of FIG. 8D, the inside width w of the groove 27 is therefore smaller than the axial extent d of the deflection plate 23.

Figure 8E:
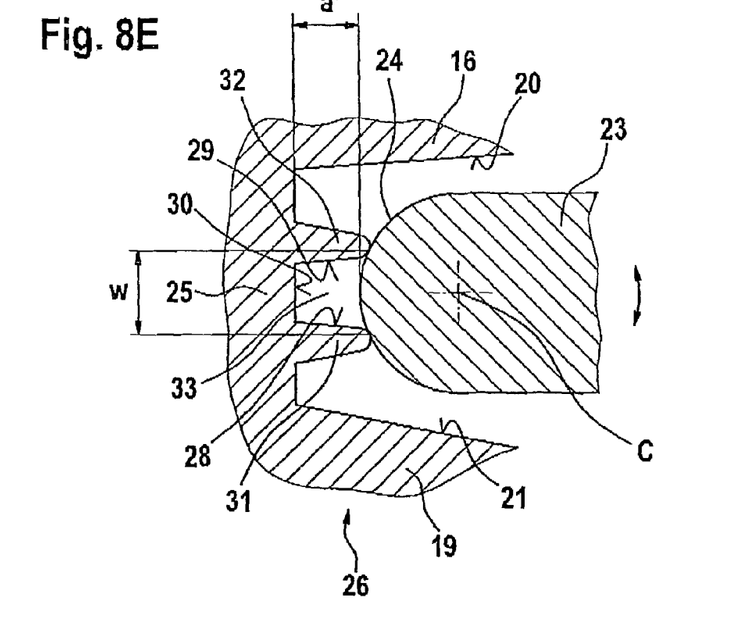
FIG. 8E a schematic detail from FIG. 5 in the region of the guide element according to a fourth embodiment.

In the embodiment of FIG. 8E, instead of a groove in the side wall 22 there are provided two cross-pieces 31, 32 on the side wall 22, between which is formed a groove-like free space 33. The cross-pieces 31, 32 run appropriately substantially parallel to the longitudinal axis of the chain link 10. The cross-pieces 31, 32 can be worn down, and therefore form a wear reserve.

Figure 8F:
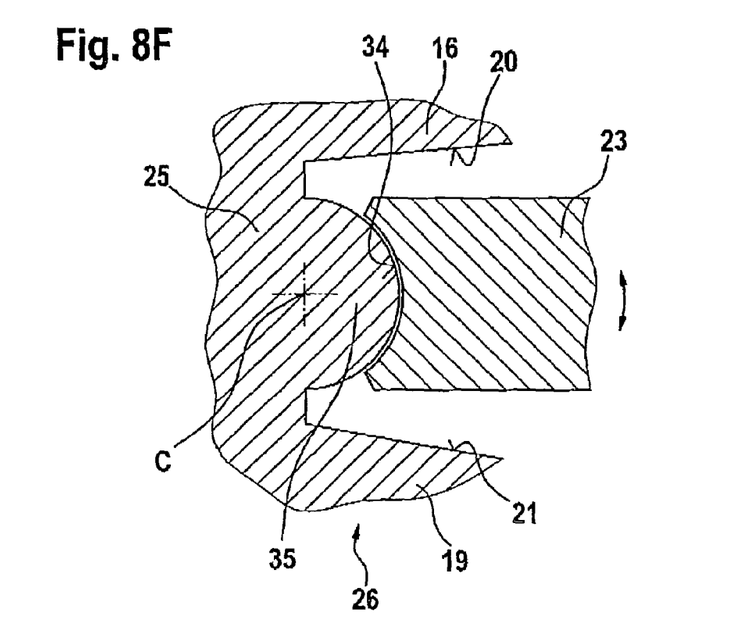
FIG. 8F a schematic detail from FIG. 5 in the region of the guide element according to a fifth embodiment.

The embodiment of FIG. 8F shows that, instead of a groove in the side wall 22 of the chain link 10, conversely a groove 34 can be provided in the outer edge of the deflection plate 23. The friction-generating guide element of the chain link 10 is in this embodiment designed as a projection 35 which is arranged on the side wall 22 of the chain link 10. The projection 35 is preferably a cross-piece oriented substantially parallel to the longitudinal axis of the chain link 10. The shape of the projection 35 in cross-section is preferably adapted to the shape of the groove 34, as shown in FIG. 8F.

Figure 5:
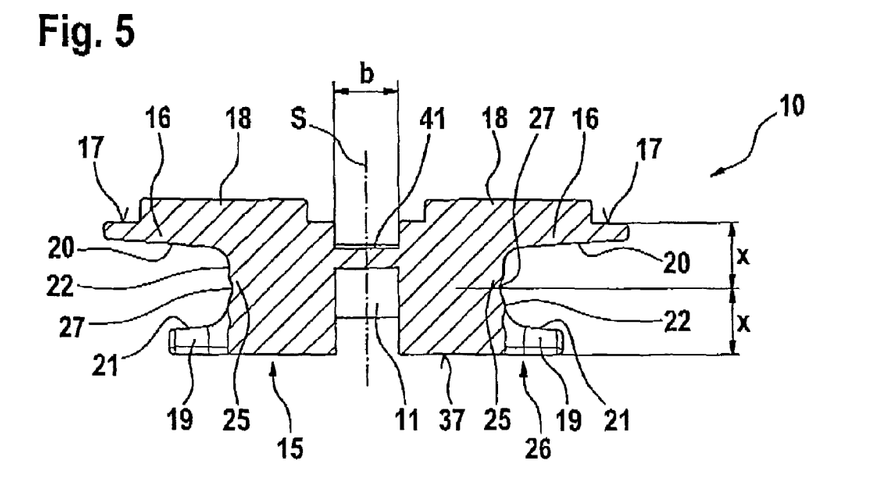
FIG. 5 a cross-sectional view of the chain link in a section through the transverse plane shown in FIG. 3.

As can be seen from FIG. 5, the guide element 27 is preferably arranged symmetrically about the hinge plane G. The hinge plane G is preferably arranged in the centre plane between the carrying surface 17 and the lower side 37 of the main body 15 of the chain link 10. By means of this arrangement, pivot moments about a longitudinal pivot axis of the chain link 10 as a result of the chain tension are minimized.

Figure 9:
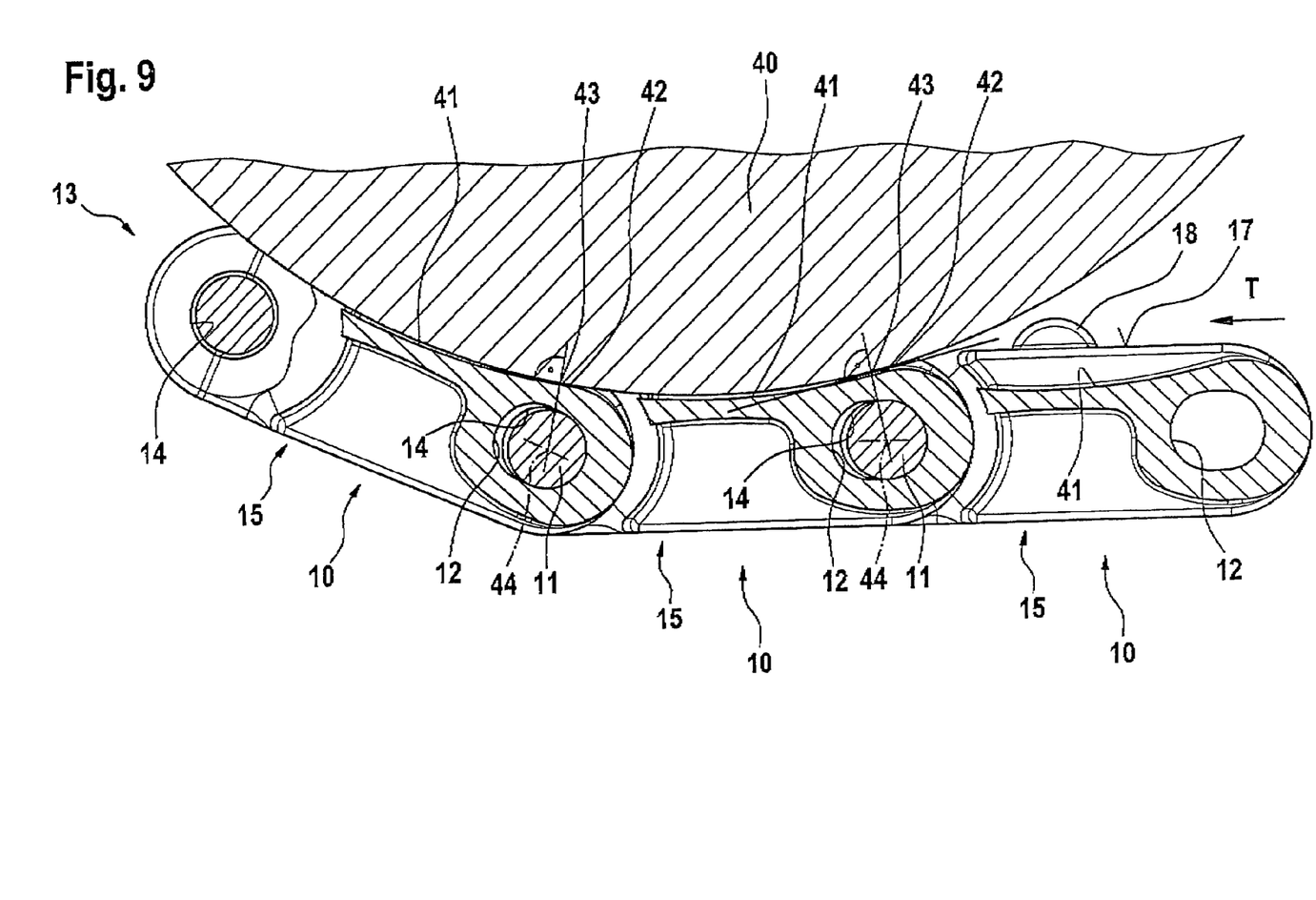
FIG. 9 a cross-sectional view of a conveying chain analogous to FIG. 3, in the region of a deflection roller of a machine.

The chain link 10 is preferably designed on the side of the carrying surface 17 to cooperate with a round deflection roller 40 of the machine rotating about a substantially horizontal axis for deflecting the conveying chain accordingly (see FIG. 9). On the side of the carrying surface of the chain link 10 for this purpose a recess 41 is provided in which the deflection roller 40 engages. The recess 41 in the present example is arcuate with a radius which is larger than the radius of the deflection roller 40. On account of the shape of the recess 41, each chain link has only one region 42 cooperating with the deflection roller 40. The recess 41 is preferably elongate and runs preferably substantially parallel to the longitudinal axis of the chain link 10. It is preferably arranged in the plane of symmetry S of the chain link 10 (see FIG. 5) to avoid the occurrence of obtrusive pivot moments as a result of the chain tension. The width b of the recess 41 corresponds to the width of the deflection roller 40 at its circumference, for example of a protrusion of the deflection roller 40 extending radially outwards, so that the recess 41 forms a lateral guide for the deflection roller 40. Appropriately, the drivers 18 on the carrying surface 17 are interrupted in the region of the deflection roller 40.

The region of contact 42 between the chain link 10 and the deflection roller 40 preferably lies in the region of one of the hinge axes, i.e. in the region of the hinge pin support axis or the hinge pin bearing axis, to avoid adverse bending moments on the chain link 10 as a result of the chain tension. This means that, in a cross-section as shown in FIG. 9, the distance from the contact region 42 to the point of intersection 43 of the perpendicular of the hinge axis 44 to the surface of the deflection roller 40 is small compared with the distance between two adjacent points of intersection 43. "Small" means not more than 20%, preferably not more than 10%. Without the recess 41, the chain link 10 would be in contact with the deflection roller 40 approximately in the middle between two adjacent hinge axes 44 or adjacent points of intersection 43, which would cause a considerable bending moment on account of the chain tension. It is also possible for a chain link 10 to have contact regions in the region of both hinge axes 44.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A chain link for a conveying chain of a storage device for a rod-shaped tobacco product, comprising:
   a hinge pin; and
   a chain link body having a longitudinal axis and including:
     a carrying element having an upper carrying surface to carry the tobacco product and a lower side;
     a side wall;
     a guide wing having an upper side;

the lower side of the carrying element, the side wall, and the upper side of the guide wing being arranged to define a U-shaped profile;
a holder for the hinge pin which defines a first hinge axis; and
a hinge pin bearing defining a second hinge axis for connecting the chain link to an adjacent chain link, the carrying surface being arranged substantially parallel to a hinge plane defined by the first and second hinge axes;
wherein the side wall is adapted to cooperate with a deflection plate of the storage device that rotates about a vertical axis or an axis inclined to the vertical, the chain link being adapted, when cooperating with the deflection plate, to pivot about a longitudinal pivot axis parallel to the longitudinal axis of the chain link body, the side wall including a friction-generating pivotal guide element, comprised of a groove arranged to pivotally engage the deflection plate so that a pivot movement of the chain link about the longitudinal pivot axis is counteracted by a frictional force exerted by the deflection plate on the guide element, wherein an inside width of the groove in the side wall is smaller than the distance between the lower side of the carrying element and the upper side of the guide wing.

2. Chain link according to claim 1, wherein an inside width of the groove in cross-section is smaller than an axial extent of the deflection plate.

3. Chain link according to claim 1, wherein the groove has a shape tapering towards an interior of the groove.

4. Chain link according to claim 1, wherein the groove has side walls which are inclined towards the interior of the groove.

5. Chain link according to claim 4, wherein the side walls have a plane of symmetry and form with the plane of symmetry an angle within the range of 10° to 60°.

6. Chain link according to claim 1, wherein the friction-generating pivotal guide element is arranged substantially in the hinge plane.

7. Chain link according to claim 1, wherein a pivot range of the chain link about the longitudinal pivot axis permits a horizontal orientation of the carrying surface during cooperation with the deflection plate.

8. Chain link according to claim 1, wherein the carrying surface is adapted to cooperate with a round deflection roller of the machine, which rotates about a substantially horizontal axis.

9. Chain link according to claim 8, wherein contact of the chain link with the deflection roller lies in the region of the hinge.

10. Chain link according to claim 8, wherein the carrying surface is provided a recess running parallel to the longitudinal axis for engagement of the deflection roller.

11. Chain link according to claim 10, wherein the recess is arcuate in a cross-section perpendicular to the hinge axes.

12. Chain link according to claim 11, wherein the radius of an arc is at least as large as the outer radius of the deflection roller.

13. Chain link according to claim 10, wherein a width of the recess corresponds to an axial extent of the deflection roller at its circumference.

14. Chain link according to claim 1, wherein the hinge plane is arranged in a center plane between the carrying surface and a lower side of the chain link opposite the carrying surface.

15. Machine of the tobacco processing industry, comprising:

a storage device for a rod-shaped tobacco product, and
a conveying chain comprising chain links according to claim 1.

16. The chain link according to claim 4, wherein the side walls have a plane of symmetry and form with the plane of symmetry an angle within the range of 20° to 50°.

17. The chain link according to claim 4, wherein the side walls have a plane of symmetry and form with the plane of symmetry an angle within the range of 35° to 45°.

18. The chain link according to claim 1, wherein the groove has an arcuate-shaped profile.

19. A chain link for a conveying chain of a storage device for a rod-shaped tobacco product, comprising:
a hinge pin; and
a chain link body having a longitudinal axis and including:
a carrying element having an upper carrying surface to carry the tobacco product, and a lower side;
a side wall;
a holder for the hinge pin which defines a first hinge axis; and
a hinge pin bearing defining a second hinge axis for connecting the chain link to an adjacent chain link, the carrying surface being arranged substantially parallel to a hinge plane defined by the first and second hinge axes;
the chain link body further including:
the side wall adapted to cooperate with a deflection plate of the storage device that rotates about a vertical axis or an axis inclined to the vertical; and
the carrying surface adapted to cooperate with a deflection roller of the storage device that rotates about a substantially horizontal axis, wherein contact with the chain link body lies in the region of one of the hinge axes, wherein the carrying surface includes a recess running parallel to the longitudinal axis for engagement of the deflection roller, wherein the recess is arcuate in a cross-section perpendicular to the hinge axes.

20. Chain link according to claim 19, wherein the radius of the arc is at least as large as the outer radius of the deflection roller.

21. Chain link according to claim 19, wherein a width of the recess corresponds to an axial extent of the deflection roller at its circumference.

22. Chain link according to claim 19, wherein the hinge plane is arranged in a center plane between the carrying surface and a lower side of the chain link opposite the carrying surface.

23. Machine of the tobacco processing industry, comprising:
a storage device for a rod-shaped tobacco product, and
a conveying chain comprising chain links according to claim 19.

24. A chain link for a conveying chain of a storage device for a rod-shaped tobacco product, comprising:
a hinge pin; and
a chain link body having a longitudinal axis and including:
a carrying element having an upper carrying surface to carry the tobacco product,
and a lower side;
a side wall;
a guide wing having an upper;
the lower side of the carrying element, the side wall, and the upper side of the guide wing being arranged to define a U-shaped profile;

a holder for the hinge pin which defines a first hinge axis; and a hinge pin bearing defining a second hinge axis for connecting the chain link to an adjacent chain link, the carrying surface being arranged substantially parallel to a hinge plane defined by the first and second hinge axes;

wherein the side wall is adapted to cooperate with a deflection plate of the storage device that rotates about a vertical axis or an axis inclined to the vertical, the chain link being adapted, when cooperating with the deflection plate, to pivot about a longitudinal pivot axis parallel to the longitudinal axis of the chain link body, the side wall including a friction-generating pivotal guide element, comprised of a projection, arranged to pivotally engage the deflection plate so that a pivot movement of the chain link about the longitudinal pivot axis is counteracted by a frictional force exerted by the deflection plate on the guide element, wherein the projection comprises an acruate-shaped surface.

* * * * *